No. 734,483. Patented July 21, 1903.

UNITED STATES PATENT OFFICE.

SAMUEL RUCKER WHITALL, OF THE UNITED STATES ARMY, ASSIGNOR, BY DIRECT AND MESNE ASSIGNMENTS, OF ELEVEN-TWENTIETHS TO FRANK MACOMB WHITALL AND JOSEPH R. EDSON, OF WASHINGTON, DISTRICT OF COLUMBIA.

COMPOSITION OF WURTZILITE, RUBBER, &c.

SPECIFICATION forming part of Letters Patent No. 734,483, dated July 21, 1903.

Original application filed May 5, 1902, Serial No. 105,908. Divided and this application filed May 26, 1902. Serial No. 109,089. (Specimens.)

*To all whom it may concern:*

Be it known that I, SAMUEL RUCKER WHITALL, a citizen of the United States, residing at Fort Myer, in the county of Alexandria and State of Virginia, have invented certain new and useful Improvements in Composition of Wurtzilite, Rubber, &c.; and I do hereby declare the following to be a full, clear, and exact description of the invention, such as will enable others skilled in the art to which it appertains to make and use the same.

This invention pertains to an improved product or compound, more especially for plastic articles.

This is a division or continuation of an application filed by me on or about the 5th day of May, 1902, Serial No. 105,908. In the former application I claim, broadly, the process of dissolving wurtzilite (in some sections of the country known as "elaterite") and the product of such process as well as said product in connection with certain other elements presently disclosed. The present application is filed to cover more particularly the product of said former application in combination with rubber, &c., to provide material from which to form various articles of manufacture or commerce of a plastic character, as before noted. Wurtzilite, sometimes known as "elaterite," the principal ingredient or element referred to in my said former application, being readily soluble in petroleum, I combine the same in its dissolved state with india-rubber as applied in the arts.

In order to enable others to practice my present invention, I will now describe the same more fully.

I have discovered that wurtzilite is soluble in petroleum, either crude petroleum or its distillates, and that when a plastic mass or solution reverts by evaporation to a consistent solid mass said mass recovers substantially its original properties, with this exception, however, that the mass is now soluble in any of the ordinary solvents of rubber and also of course in petroleum or its distillates. The solution of wurtzilite is effected by merely bringing the material into intimate contact with petroleum or its distillates. The mass is preferably reduced to a fine condition or pulverized, and the solvent action of petroleum, &c., may be aided by moderate heat.

My invention therefore consists in the mode of making articles for commerce containing wurtzilite, as hereinafter more fully described, and particularly pointed out in the claims.

Wurtzilite is a mineral without any determinate form and would be classed as amorphous. It is never found crystallized. By reflected light it is of a dark nearly-black brownish color, fracture conchoidal, streak brown; by transmitted light through a thin piece of a dark orange-red, nearly brown. When at the ordinary temperature, it is strong, tough, and requires a sharp heavy blow to break it. When warmed, it is tough and somewhat elastic, not oxidizable, not affected by the strongest acids or any combination of acids either cold or hot except by a slight discoloration, not soluble in alkalies or any of the ordinary solvents of india-rubber except coal-tar naphtha, which does not entirely dissolve it unless used in very large proportion to the quantity of wurtzilite soluble in petroleum. By distillation it gives off gas and four or five oils, a heavy white oil, a brown oil, a rich yellow golden-colored oil, leaving a thick pasty residue, and has about ten per cent. of fixed carbon, showing perhaps a trace of sulfur.

Having dissolved the mineral without destroying any of its valuable commercial properties for use in the arts, either with or without the aid of heat, my prepared or allotropic wurtzilite, which is a mineral having the essential properties of wurtzilite which has been reduced by petroleum or its distillates to a condition for use in making the so-called "plastic" articles or being itself soluble in the solvents of india-rubber, can be sold to manufacturers for use in making either of the articles of commerce hereinafter indicated.

I will now describe my preferred method of preparing wurtzilite for use for commercial purposes. The mineral is mixed with a solvent, hereinbefore described, and ground, under atmospheric pressure, in a suitable apparatus—say a paint-mill, of any preferred construction, set to grind to a fineness of a sixty-mesh screen, more or less, as may be desired. To accomplish this, the mineral is first crushed or broken up into small pieces to enable it to be readily ground to the desired fineness. I then take the pulp or powder and place it in suitable vessels—say kettles of pressed steel, or pots of cast-iron, or any suitable vessel of proper size to suit the manufacturer—and place the vessels on a furnace or stove, so constructed that when the vessels or kettles are placed therein none of the flame will press up around the sides of the furnace or through the openings thereof in which the kettles are to be placed. Any crevices in the furnace should be well luted or closed to prevent any flame or spark from coming into contact with the contents of the kettles. When it is desired to dissolve this mineral in large quantities, a suitable furnace of brick of any length desired may be employed, the top of which should preferably be of cast-iron, with openings therein to fit the vessels to be used thereon. The furnace may be provided with a fire-box, doors, flues, and dampers to regulate the heat and draft. Tight-fitting covers should be provided to place over the openings when one or more of the vessels are removed from the furnace. The finely-ground material or pulp is placed in a vessel with petroleum-oil, either crude or refined oil, but preferably any petroleum that does not contain the mineral wax known as "paraffin." After the materials have become thoroughly mixed the vessel is covered and placed on the furnace and heated to a moderate temperature, occasionally stirring the contents of the vessel to dissolve the wurtzilite, which should be thoroughly dissolved in from one to two hours, according to the fineness of the pulp. The quantity of oil to be incorporated with the pulp should be the smallest quantity that is necessary to dissolve the pulp. When after examination no undissolved particles are found, the pulp is readily poured out upon slabs of stone, a clean wooden table, or into suitable molds to cool or harden.

The foregoing constitutes the quickest and my preferred method of dissolving wurtzilite, comprising the use of heat with the solvent petroleum, as hereinbefore described; but I have often obtained satisfactory results as follows: Break the wurtzilite into pieces small enough to be readily ground in a grinding-mill or to a fineness sufficient to hold the oil and prevent its separating and running out of the mill. Then grind the mineral with the oil, after which it will be found that most of the mineral has been dissolved. Any residue of the mineral can be dissolved in the manner previously described, or it can be strained off and then be used over in the mill with a fresh supply of oil and pulp.

Prepared wurtzilite may be alloyed with rubber or rubber solution in the solvents mentioned, and they will form a consistent homogeneous mass. This homogeneous mass, composed of prepared wurtzilite and rubber in a common solvent, is similar to an alloy. It has the properties of both the prepared wurtzilite and the rubber, the prepared wurtzilite becoming more elastic and the rubber more tough when in the alloy. This homogeneous mass can be used for similar purposes and uses as rubber. In this alloy of prepared wurtzilite and rubber the adulterants of rubber may be used in place of the rubber. Instead of applying heat to the wurtzilite or prepared wurtzilite after it has been mixed with the oil the oil may be heated before it has been mixed with the wurtzilite, &c.

It will be understood that I herein make no claim for the process of treating wurtzilite to render it suitable for the production of paints, varnishes, &c., as such process is the subject-matter of an application filed by me May 5, 1902, Serial No. 105,908.

Having thus described my invention, what I claim as new, and desire to secure by Letters Patent, is—

1. A mass consisting of an admixture of wurtzilite and rubber.

2. A mass consisting of an admixture of wurtzilite and of rubber or the adulterants of rubber.

3. A mass consisting of wurtzilite and rubber in the intimate state of their admixture arising from a previous solution in a common solvent.

4. A mass consisting of an intimate union of wurtzilite and rubber wherein the physical properties of each are physically indistinguishable.

5. A mass consisting of wurtzilite and rubber, wherein each dissolves or alloys the other.

6. A mass consisting of an allotropic wurtzilite and rubber in the intimate state of their admixture arising from a previous solution in a common solvent.

7. A mass consisting in an intimate union of allotropic wurtzilite and rubber wherein the physical properties of each are physically indistinguishable.

8. A mass consisting of allotropic wurtzilite and rubber wherein each dissolves or alloys the other.

In testimony whereof I affix my signature in presence of two witnesses.

SAMUEL RUCKER WHITALL.

Witnesses:
EDWIN B. H. TOWER, Jr.,
W. CLARENCE DUVALL.